United States Patent
Windhoevel et al.

(10) Patent No.: US 6,800,682 B1
(45) Date of Patent: Oct. 5, 2004

(54) GLUING, SEALING AND COATING COMPOUND

(75) Inventors: Udo Windhoevel, Monheim (DE); Hartmut Urbath, Wuppertal (DE); Helmuth Loth, Essen (DE); Wolfgang Klauck, Meerbusch (DE); Johann Klein, Duesseldorf (DE); Kai Boege, Duesseldorf (DE)

(73) Assignee: Henkel Kommanditgesellschaft auf Aktien (Henkel KGaA), Duesseldorf (DE)

( * ) Notice: Subject to any disclaimer, the term of this patent is extended or adjusted under 35 U.S.C. 154(b) by 0 days.

(21) Appl. No.: 08/973,916

(22) PCT Filed: Jun. 19, 1996

(86) PCT No.: PCT/EP96/02655

§ 371 (c)(1),
(2), (4) Date: Dec. 16, 1997

(87) PCT Pub. No.: WO97/00912

PCT Pub. Date: Jan. 9, 1997

(30) Foreign Application Priority Data

Jun. 22, 1995 (DE) .......................... 195 22 749

(51) Int. Cl.⁷ .............................................. C08K 5/06
(52) U.S. Cl. ........................................ 524/366; 524/577
(58) Field of Search ................................ 524/577, 366

(56) References Cited

U.S. PATENT DOCUMENTS

| | | | |
|---|---|---|---|
| 2,353,228 A | 7/1944 | Ducca ........................ 260/36 |
| 2,718,509 A | 9/1955 | Lundsted et al. .......... 260/33.2 |
| 3,267,174 A | 8/1966 | Fry et al. .................... 260/848 |
| 3,689,532 A | 9/1972 | Emmons et al. ......... 260/485 G |
| 4,102,845 A | 7/1978 | Schröder et al. ........... 260/29.7 |
| 4,225,490 A | 9/1980 | Columbus et al. ..... 260/29.6 M |
| 4,265,796 A | 5/1981 | Mueller-Mall et al. .... 260/29.6 |
| 4,505,618 A | 3/1985 | Yashima ..................... 405/216 |
| 4,845,149 A | 7/1989 | Frazee ........................ 524/458 |
| 4,869,934 A | 9/1989 | Jethwa .................... 427/393.5 |
| 5,196,468 A | 3/1993 | Schwerzel et al. .......... 524/272 |
| 5,284,894 A | 2/1994 | Wasyliw et al. ............ 524/377 |
| 5,322,876 A | 6/1994 | Sasaki et al. ............... 524/366 |

FOREIGN PATENT DOCUMENTS

| | | |
|---|---|---|
| CZ | 259 825 | 3/1989 |
| DE | 16 69 052 | 5/1971 |
| DE | 32 03 488 | 8/1983 |
| DE | 33 04 695 | 8/1984 |
| DE | 36 38 224 | 5/1988 |
| DE | 43 24 474 | 1/1995 |
| DE | 195 31 849 | 3/1996 |
| EP | 0 118 726 | 9/1984 |
| EP | 0 127 056 | 12/1984 |
| EP | 0 127 057 | 12/1984 |
| EP | 0 268 169 | 5/1988 |
| EP | 0 309 114 | 3/1989 |
| EP | 0 490 191 | 6/1992 |
| FR | 1 177 808 | 4/1959 |
| GB | 781 900 | 7/1955 |
| PL | 119 091 | 1/1980 |
| WO | WO 92/02583 | 2/1992 |
| WO | WO 94/24202 | 10/1994 |
| WO | WO95/11284 | 4/1995 |

OTHER PUBLICATIONS

Technical Information Pamphlet: Plastilit 3060, BASF, TI/ED 1115 d–1 Jan. 1984.

Primary Examiner—Peter D. Mulcahy
(74) Attorney, Agent, or Firm—Stephen D. Harper, Esq.; Michael E. Carmen, Esq.

(57) ABSTRACT

A gluing, sealing and coating compound based on a styrene copolymer is characterized in that the styrene copolymer mainly contains styrene and in that it contains an aromatic compound-free polyalkylene oxide and/or its fatty derivative. These non-toxic plastcizers are easily tolerated and increase stickiness, elasticity and stretchability. These compounds are therefore suitable as binders for producing glues, coatings and sealing compounds.

24 Claims, No Drawings

GLUING, SEALING AND COATING COMPOUND

This invention relates to an adhesive, sealing and coating compound based on a copolymer of styrene with at least one other comonomer and a polyalkylene oxide as plasticizer.

BACKGROUND OF THE INVENTION

Compounds of the type in question are known. Thus, U.S. Pat. No. 4,869,934 describes a composition for smoothing, cleaning and coating floors which consists, for example, of the following components: 31.2 parts by weight of a copolymer of butyl methacrylate, methacrylic acid, methyl methacrylate and styrene in a ratio of 10:18:52:20, 1.6 parts by weight of the permanent plasticizer $(BuOCH_2CH_2O)_3PO$ and 7.0 parts by weight of the volatile plasticizer $Me(OC_3H_6)_2OH$ and about 48 parts by weight of water. This known composition has the disadvantage that at least the volatile plasticizers pollute the environment or are even toxic.

The product "Plastilit 3060" is described in BASF's Technical Information Pamphlet TI/ED 1115 d-1 of January, 1984. This product is a polypropylene glycol alkyl phenyl ether which is used as a plasticizer for polymer dispersions, more particularly for polyacrylates. Polymers specifically mentioned include a copolymer of styrene and butyl acrylate and a copolymer of ethyl acrylate, ethyl hexyl acrylate and acrylonitrile. Compositions of the type in question may be used, for example, as sealing compounds which form a skin shortly after application, undergo relatively little post-curing and exhibit better elastic behavior at low temperatures. In addition, in conjunction with fillers, they form paste-like tile adhesives which combine favorable tensile strengths with high elasticity. The plasticizer has an elasticizing effect on the copolymer without significantly affecting the water absorption of the film. Thus, the elongation of a film increases almost linearly from about 300% to 4,000% after the addition of 9% of plasticizer. So far as the biological effect of the plasticizer is concerned, the information available suggests that it has no health-damaging effects although there could be some irritation of the skin and mucous membrane after prolonged exposure. Another disadvantage is that the viscosity of the dispersion is significantly increased by the addition of Plastilit 3060. The addition of fillers is seriously limited as a result. In addition, there is hardly any scope for adding other plasticizers.

The same disadvantages also apply to the following two documents. Polish patent PL 119091 describes a non-toxic and non-inflammable adhesive for ceramics and plastics which, in addition to an acrylate/styrene dispersion, contains polypropylene glycol alkyl phenyl ether, fillers, organic solvents and water.

German patent DE 36 38 224 describes an elastic sealing material which contains a styrene/butadiene rubber, an α-methyl styrene polymer, solvents, such as hydrocarbons and aromatic hydrocarbons, and polypropylene glycol alkyl phenyl ether.

Czech patent CS 259825 describes a contact adhesive for labels and tapes which mainly contains a copolymer of acrylates, unsaturated carboxylic acids and, optionally, styrene, alkyl styrene or vinyl acetate. Other components are organic solvents and plasticizers such as, for example, polyethylene glycol and polypropylene glycol.

DETAILED DESCRIPTION OF THE INVENTION

Against the background of this prior art, the problem addressed by the present invention was to provide a non-toxic composition of a styrene copolymer and a non-aromatic plasticizer which would be suitable for use as a binder and would provide acceptable adhesion.

The solution provided by the invention is defined in the claims and is characterized in that the styrene copolymer mainly contains styrene while the plasticizer is a non-aromatic polyalkylene glycol and/or an oleochemical derivative thereof.

The styrene copolymer mainly contains styrene or methyl styrene, preferably more than 30% by weight and, in particular, more than 60% by weight, based on the monomers as a whole, and at most 98% by weight, more particularly 85% by weight. Comonomers of styrene or methyl styrene are, in particular, acrylates and methacrylates containing 1 to 12 carbon atoms in the alcohol component, more particularly 2 to 8 carbon atoms. The acrylates may also contain reactive groups for subsequent crosslinking. Other suitable comonomers are vinyl ester, maleic acid ester, ethylene, acrylamide, acrylic acid, butadiene and acrylonitrile which may be used both individually and in the form of mixtures. Statistical copolymers with a molecular weight of more than 100,000 g/mole (gel chromatography) are preferably produced from the monomers mentioned above. Commercially available styrene copolymers are Acronal 290 D, Scopacryl D 343, Ubatol VAF 1539, Acronal S 360 D, Scopacryl PAA D 8875, Acronal S 400, Acronal S 401, Styrofan A 900, Rhodopas DS 913, Joncryl 678, Vinnapas LL 6010 and SAF 54, Neocryl A 621 (copolymers of styrene and acrylic acid ester); Pliotec LS 1 (terpolymer of styrene, butyl acrylate and methacrylic aid); Mowilith DM 611, Mowilith DM 680, Styropor P 555 (pure styrene); Buna EM 2116, Styrolux 684 D, Rhodopas SB 012 (copolymers of styrene and butadiene); Novodur P2M, Synthomer VL 10286 (terpolymers of styrene, butadiene and acrylonitrile).

The styrene copolymers may be prepared by known methods, more particularly by emulsion or bead polymerization. Aqueous dispersions with a concentration of about 40 to 70% by weight of styrene copolymer are formed. However, the styrene copolymers may also be produced by bulk or solution polymerization.

In the context of the invention, a polyalkylene oxide is a polyether with the general formula $X(R—O—)_nH$ where R may be one or more (preferably one) of the following groups: ethylene, propylene or tetramethylene group; n is a number of 1 to 50, preferably 2 to 30 and more preferably 4 to 20; X is a non-aromatic starter molecule containing 1 to 12 and, more particularly, 1 to 6 functional groups. Preferred polyalkylene oxides are polyethylene glycol and polypropylene glycol. However, polybutylene glycols are also suitable. Block copolymers of polyethylene glycol and polypropylene glycol may also be used. The terminal OH groups may also be completely or partly esterified (for example with fatty acids or dicarboxylic acids) or etherified. The molecular weight (osmotic number average) is preferably 5,000, more particularly below 2,500 and above all below 1,500. Commercially available polyalkylene oxides include polypropylene glycols 420, 620 and 2020 (Hüls AG), Pluronic types (BASF), Voranols (Dow) and polyglycols (Hoechst).

The polyalkylene oxides are generally produced by polyaddition of ethylene oxide and/or propylene oxide onto water, ethylene glycol, propylene glycol, polyhydric alcohols, such as glycerol, polyglycerol, trimethylol propane, pentaerythritol, sorbitol, glucose, polysaccharides, ammonia, triethanolamine, carboxylic acids, etc.

Other suitable starter molecules for this polyaddition are fatty compounds containing functional groups which react with ethylene oxide or propylene oxide. These fatty compounds contain on average 1 to 10 and preferably 1.5 to 6.0 of at least one of the following functional groups: —OH, —SH, —NH$_2$, —COOH or anhydride or oxide groups in the presence of water.

However, fatty compounds with no functional groups may also be used. In their case, however, catalytic quantities of water, alcohols or carboxylic acids have to be added for the reaction.

Reactions of functionalized fatty derivatives, such as epoxidized soybean oil or triglyceride/MA adducts, with polyalkylene oxides also lead to the products according to the invention.

"Fatty compounds" in the context of the invention are fatty acids, fatty alcohols and derivatives thereof providing they contain at least one of the functional groups mentioned above. In general, their molecular weight is above 100 and more particularly above 200. The upper limit is 20,000 and preferably in the range from 300 to 1,500. The ratio by weight of the polyether to the reaction product of ethylene oxide or propylene oxide with the fatty compound is 1:0.01 to 3 and preferably 1:0.1 to 2.

"Fatty acids" in the context of the invention are understood to be acids containing one or more carboxyl groups (—COOH). The carboxyl groups may be attached to saturated, unsaturated, linear or branched alkyl groups containing more than 8 carbon atoms and, in particular, more than 12 carbon atoms. Besides the —OH, —SH, —C=C—, —COOH, amino, anhydride or epoxide groups described above, they may contain other groups, such as ether, ester, halogen, amide, amino, urethane and urea groups. However, carboxylic acids, such as native fatty acids or fatty acid mixtures, dimer fatty acids and trimer fatty acids, are preferred. Specific examples of the fatty acids besides the saturated types are, in particular, the mono-or polyunsaturated acids palmitoleic, oleic, elaidic, petroselic, erucic, ricinoleic, hydroxymethoxystearic, 12-hydroxystearic, linoleic, linolenic and gadoleic acid.

Besides the naturally occurring fatty acids, polyhydroxyfatty acids may also be used. They may be obtained, for example, by epoxidation of unsaturated fats and oils or esters of fatty acids with alcohols, ring opening with H-active compounds such as, for example, alcohols, amines and carboxylic acids and subsequent saponification. The fats or oils required as starting material may be of both vegetable and animal origin or may optionally be specifically synthesized by petrochemical methods.

The fatty acids may also be derived from oil- and fat-based raw materials obtainable, for example, by ene reactions, Diels-Alder reactions, transesterification reactions, condensation reactions, grafting reactions (for example with maleic anhydride or acrylic acid, etc.) and epoxidation reactions. The following are examples of such raw materials: a) epoxides of unsaturated fatty acids, such as palmitoleic acid, oleic acid, elaidic acid, petroselic acid, erucic acid, linoleic acid, linolenic acid, gadoleic acid; b) reaction products of unsaturated fatty acids with maleic acid, maleic anhydride, methacrylic acid or acrylic acid; c) condensation products of hydroxycarboxylic acids, such as ricinoleic acid or 12-hydroxystearic acid, and polyhydroxycarboxylic acids.

Not all the fatty acids described above are stable at room temperature. Accordingly, derivatives of the fatty acids mentioned above, such as esters or amides, may if necessary be employed for the use according to the invention.

One preferred embodiment of the invention is characterized by the use of esters or partial esters of the above-mentioned fatty acids with monohydric or polyhydric alcohols. "Alcohols" are understood to be hydroxyl derivatives of aliphatic and alicyclic, saturated, unsaturated, unbranched or branched hydrocarbons. Besides monohydric alcohols, these include the low molecular weight chain extenders or crosslinkers containing hydroxyl groups known per se from polyurethane chemistry. Specific examples of low molecular weight types are methanol, ethanol, propanol, butanol, pentanol, decanol, octadecanol, 2-ethylhexanol, 2-octanol, ethylene glycol, propylene glycol, trimethylene glycol, tetramethylene glycol, 2,3-butylene glycol, hexamethylenediol, octamethylenediol, neopentyl glycol, 1,4-bis-hydroxymethyl cyclohexane, Guerbet alcohol, 2-methylpropane-1,3-diol, hexane-1,2-6-triol, glycerol, trimethylol propane, trimethylol ethane, pentaerythritol, sorbitol, formitol, methyl glycoside, butylene glycol, the dimer and trimer fatty acids reduced to alcohols. Alcohols derived from colophony resins, such as abietyl alcohol, may also be used for the esterification reaction.

Instead of alcohols, OH-containing tertiary amines, polyglycerol or partly hydrolyzed polyvinyl esters may also be used.

In addition, polycarboxylic acids or hydroxycarboxylic acids may be added for the oligomerization reaction. Examples include oxalic acid, malonic acid, succinic acid, maleic acid, fumaric acid, glutaric acid, adipic acid, suberic acid, sebacic acid, 1,11-undecanedioic acid, 1,12-dodecanedioic acid, phthalic acid, isophthalic acid, terephthalic acid, hexahydrophthalic acid, tetrahydrophthalic acid or dimer fatty acid, trimer fatty acid, citric acid, lactic acid, tartaric acid, ricinoleic acid, 12-hydroxystearic acid. Adipic acid is preferably used.

Examples of suitable esters besides the partly saponified fats, such as glycerol monostearate, are preferably the natural fats and oils of rape sunflowers, soya, linseed, castor, coconuts, oil palms, oil palm kernels and oil trees and methyl esters thereof. Preferred fats and oils are, for example, beef tallow with a chain distribution of 67% oleic acid, 2% stearic acid, 1% heptadecanoic acid, 10% saturated acids with a chain length of $C_{12}$ to $C_{16}$, 12% linoleic acid and 2% saturated acids containing more than 18 carbon atoms or, for example, the oil of new sunflowers (NSf) with a composition of about 80% oleic acid, 5% stearic acid, 8% linoleic acid and about 7% palmitic acid. The corresponding epoxides and reaction products with maleic anhydride, for example, may of course also be used. Other examples include partly and completely dehydrated castor oil, partly acetylated castor oil, ring opening products of epoxidized soybean oil with dimer fatty acid.

Fatty acid esters and derivatives thereof obtainable by epoxidation may also be used. Examples of such esters include soybean oil fatty acid methyl ester, linseed oil fatty acid methyl ester, ricinoleic acid methyl ester, epoxystearic acid methyl ester, epoxystearic acid-2-ethylhexyl ester. Among the glycerides, preference is attributed to the triglycerides, for example rapeseed oil, linseed oil, soybean oil, castor oil, partly and completely dehydrated castor oils, partly acetylated castor oil, soybean oil epoxide, linseed oil epoxide, rapeseed oil epoxide, epoxidized sunflower oil.

Epoxidized triglycerides of unsaturated fatty acids ring-opened with nucleophiles are preferably used. Nucleophiles in the context of the invention are alcohols such as, for example, methanol, ethanol, ethylene glycol, glycerol or trimethylol propane; amines such as, for example, ethanolamine, diethanolamine, triethanolamine, ethylenediamine or hexamethylenediamine; or carboxylic acids such as, for example acetic acid, dimer fatty acid, maleic acid, phthalic acid or a mixture of fatty acids containing 6 to 36 carbon atoms.

The fats and oils (triglycerides) may be used both in native form and after thermal and/or oxidative treatment or in the form of the derivatives obtainable by oxidation or by the addition of maleic anhydride or acrylic acid. Specific examples include palm oil, peanut oil, rapeseed oil, cottonseed oil, soybean oil, castor oil, partly and completely dehydrated castor oils, partly acetylated castor oils, sunflower oil, linseed oil, stand oils, blown oils, epoxidized soybean oil, epoxidized linseed oil, rapeseed oil, coconut oil, palm kernel oil and tallows.

Amides are also suitable derivatives of the fatty acids mentioned above. They may be obtained by reaction with primary and secondary amines or polyamines, for example with monoethanolamine, diethanolamine, ethylenediamine, hexamethylenediamine, ammonia, but must still contain nucleophilic groups for the reaction with the alkylene oxides.

"Fatty alcohols" in the context of the invention are understood to be compounds containing one or more hydroxyl groups. The hydroxyl groups may be attached to saturated, unsaturated, linear or branched alkyl groups containing more than 8 carbon atoms and, in particular, more than 12 carbon atoms. Besides the —SH, —C=C—, —COOH, amino, anhydride groups or epoxide groups required for the subsequent reaction with the alkylene oxides, they may contain other groups, for example ether, ester, halogen, amide, amino, urea and urethane groups. Specific examples of the fatty alcohols according to the invention are ricinoleyl alcohol, 12-hydroxystearyl alcohol, oleyl alcohol, erucyl alcohol, linoleyl alcohol, linolenyl alcohol, arachidyl alcohol, gadoleyl alcohol, erucyl alcohol, brassidyl alcohol, dimerdiol (=hydrogenation product of dimer fatty acid methyl ester).

Derivatives of the fatty alcohols include symmetrical and non-symmetrical ethers and esters with monocarboxylic and polycarboxylic acids. Monocarboxylic acids are understood to be formic acid, acetic acid, propionic acid, butyric acid, valeric acid, caproic acid, oenanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachic acid, behenic acid, lignoceric acid, cerotic acid and melissic acid. Polycarboxylic acids are, for example, oxalic acid, adipic acid, maleic acid, tartaric acid and citric acid. At the same time, the fatty acids described above, for example oleic acid oleyl ester, may also be used as the carboxylic acid.

The fatty alcohols may also be etherified, more particularly with polyhydric alcohols, for example alkyl polyglycosides, dimerdiol ether. Mixtures of the fatty compounds mentioned above may of course also be used as starter molecules for the reaction with the alkylene oxides.

The ratio by weight of the styrene copolymer to the plasticizing non-aromatic polyalkylene glycol or oleochemical derivative thereof is 100:0.5 to 50, preferably 100:2.5 to 40 and above all 100:7.5 to 15 or 100:20 to 40.

Besides these two key components, the compounds according to the invention may contain other ingredients, for example antioxidants, pigments, fillers, plasticizers, preservatives, defoamers, film-forming aids, perfumes, water, coupling agents, solvents, dyes, flameproofing agents, flow control agents, resins, tackifiers, viscosity regulators, dispersion aids (for example the sodium or ammonium salt of polyacrylic acid), emulsifiers (for example alkyl ether phosphates and sulfosuccinates) and thickeners (for example MC, HEG).

Suitable resins are polyisobutylene and polybutylene (for example Hyvis 10 of BP), colophony resins and derivatives thereof (esters, hydrogenated products, abietyl alcohol), acrylate resins, phenolic resins, terpene/phenol resins, polyterpenes, epoxy resins, hydrocarbon resins, indene/coumarone resins and melamine resins.

Suitable antioxidants are, for example, phosphorous acid and salts thereof, hypophorous acid and salts thereof, ascorbic acid and derivatives thereof (particularly ascorbyl palmitate), tocopherol and derivatives thereof, mixtures of ascorbic acid derivatives and tocopherol derivatives, sterically hindered phenol derivatives, particularly BHA (tert.butyl-4-methoxyphenol) and BHT (2,6-ditertbutyl-4-methylphenol), gallic acid and derivatives thereof, particularly alkyl gallates, aromatic amines such as, for example, diphenylamine, naphthylamine and 1,4-phenylenediamine, dihydroquinoline, organic sulfides and polysulfides, dithiocarbamates and mercaptobenzimidazole.

Suitable viscosity regulators are, for example, cellulose ether, hydrogenated castor oil and highly disperse silicas.

Suitable fillers and pigments are chalk, heavy spar, kaolin, carbon black, gypsum, Aerosil, silica gel, kaolins, talcum, graphite, metal oxides of aluminium, iron, zinc, titanium, chromium, cobalt, nickel, manganese, etc., optionally in the form of mixed oxides, chromates, molybdates, carbonates, silicates, aluminates, sulfates, native fibers, cellulose, wood chips, phthalocyanines and silica flour.

Other plasticizers which may be used in addition to the plasticizers according to the invention are oleochemical plasticizers with no polyalkylene oxide components, more particularly fatty acid methyl ester, fatty acid esters with other alcohols, triglycerides. The quantities (parts by weight) in which the additives are used will be governed by the intended application.

In general, the same fatty compounds described above as starting materials for the production of oleochemical derivatives of polyalkylene oxides may be used as additional plasticizers. However, a reactive group is no longer necessary. It be deactivated, for example, by reaction with a monohydric alcohol or a carboxylic acid containing 1 to 4 carbon atoms.

The compound according to the invention is produced from the starting materials as follows: the plasticizer according to the invention may be added to the copolymer or to the copolymer dispersion after, during or before the polymerization. The formulations are generally produced by initially introducing the polymer or the polymer dispersion into the reaction vessel and adding the other components while stirring (optionally at elevated temperature). Copolymer dispersions are preferably used.

The plasticizers according to. the invention can generally bring about the following changes in the styrene copolymer:

The glass transition temperature is reduced.

The copolymer becomes tacky.

The viscosity is partly increased, partly reduced.

Breaking elongation is drastically increased.

Elongation under maximum force is also drastically increased which suggests rubber-elastic behavior.

However, it is particularly important that these effects are permanent, i.e. no migration of the plasticizer was observed over a period of 3 weeks at 60° C. This is confirmed by the following test: the films were stored between silicone paper for 3 weeks at 60° C. and were evaluated for staining of the paper at intervals of 3 days.

Polypropylene glycol with a molecular weight of about 600 g/mole, for example, is particularly effective. It reduces the viscosity of styrene/butyl acrylate copolymer from 7,500 to 1,700 when added in a quantity of 15% by weight. The conditions were as follows: 100 parts by weight of Acronal 290 D were mixed with 15 parts by weight of Polypropylenglykol 620 (Hüls AG) in a glass beaker for 30 minutes at 60° C. until the dispersion appeared homogeneous. Breaking elongation is also increased to more than 12,000%. The TG is reduced to −35° C. Other particularly important plasticizers according to the invention are Pentaglycerol×20 EO×50 PO, TMP×12 PO and a reaction product of epoxidized soybean oil with head-fractionated fatty acid reacted with 20% by weight of ethylene oxide. They have the following particular effect: in a certain concentration, they also reduce the viscosity of the dispersion and the glass transition temperature. They also provide the polymer film with rubber-elastic behavior.

By virtue of these properties, the compositions according to the invention are suitable for use as binders in the formulation of adhesives, sealing compounds and coating compounds.

Adhesives in the context of the present invention include hotmelt adhesives, solvent-based adhesives, dispersion adhesives, assembly adhesives, contact and pressure-sensitive adhesives and redispersion powders, multipurpose adhesives and adhesive sticks. Suitable substrates include paper, paperboard, wood, textiles, wall coverings, tiles, labels, leather, rubber, plastics, glass, ceramics and metals. Coatings include plastisols, dispersion paints and roof insulations. The sealing compounds may be used both in the building industry and in the automotive industry. The compound according to the invention may also be added to hydraulic binders, for example cement or gypsum.

The adhesive varies in its properties, for example in its viscosity and, in particular, in its adhesive strength, according to the type and quantity of plasticizer used and the general composition. For example, a composition of 80% by weight of Acronal 290 D and 20% by weight of Polypropylenglykol 600 prevents floor coverings, more particularly carpet tiles with a textile bottom or a backing of bitumen, PVC or atactic polypropylene, from slipping on typical substrates. The substrate may consist of screeds, for example a cement or anhydrite screed, wooden boards or chipboards and metal substrates. These may be untreated or primed and pretreated with a levelling compound or coating based on cement, polyurethane, epoxy resin or a dispersion.

The following composition not only has a non-slip effect, it also secures the floor covering on the substrates mentioned above with relatively high but limited strength so that it can easily be removed again:

30% by weight Acronal 290 D,

5% by weight Polypropylenglykol 600,

5% by weight dispersion aid, emulsifier, defoamer, thickener,

15% by weight colophony methyl ester,

15% by weight water,

30% by weight chalk.

The floor covering may be in the form of sheets or tiles and may consist of PVC or a textile material. More particularly, it may be a cushioned vinyl or a textile covering with a latex or PUR foam backing, a textile bottom or a stabilizing coating.

The two compositions may be prepared by stirring the other raw materials into the dispersion in the order mentioned at a temperature of 15 to 50° C. and, more particularly, 15 to 30° C.

The following composition leads to firm bonding of the floor covering to the substrates mentioned above:

35% by weight Acronal 290 D.

37% by weight chalk,

20% by weight of an 80% solution of balsam resin in diethylene glycol monobutyl ether, 5% by weight Polypropylenglykol 600 and 3% by weight dispersion aid, emulsifier, defoamer, thickener.

The floor covering to be bonded may be a PVC, CV, linoleum or textile covering with various backings or a heterogeneous covering with a textile or PVC bottom.

The composition is produced as follows: Polypropylenglykol 600, dispersion aid, emulsifier, defoamer and thickener are stirred into the dispersion at 15 to 30° C. The balsam resin solution heated to 50–90° C. and preferably to 70–80° C. is then continuously added and the mixture is homogenized by stirring. The filler is then added with stirring. Thereafter the mixture is stirred until it is lump-free and homogeneous.

To produce a joint sealing compound, the TG of the styrene copolymer must be below −10° C. and preferably below −20° C. In addition, the dispersion must form a smooth film despite its high filler content. A suitable sealing compound has the following composition for example: 34% by weight Acronal 290 D, 1% rapeseed oil methyl ester, 5% Polypropylenglykol 600 and 60% chalk. This dispersion is paste-like and is easy to spread. The film produced from the dispersion is elastic and shows high resilience. Accordingly, this composition is suitable for use as a joint sealing compound.

EXAMPLES

| I. | Starting materials |
|---|---|
| 1. | Acronal 290 D = 50% aqueous dispersion of a styrene/butyl acrylate copolymer (anionic) |
| 2. | PPG 620 = Polypropylenglykol, MW ~600, |
| 3. | PPG 2020 = Polypropylenglykol, MW ~2,000, |
| 4. | A = reaction product of a fatty alcohol (containing 12 to 14 carbon atoms) with ethylene oxide in a molar ratio of 1:3, |
| 5. | B = reaction product of castor oil with ethylene oxide in a molar ratio of 1:20, |
| 6. | C = polypropylene glycol alkyl phenyl ether (Plastilit 3060), |
| 7. | D = reaction product of epoxidized soybean oil with head-fractionated fatty acid reacted with 20% by weight of ethylene oxide, for example as follows: In an autoclave, 4,000 g of soya polyol 85 are mixed with 12.5 g of a 50% aqueous KOH. To remove the water present, a vacuum of <40 mbar is applied for 20 minutes at 90° C.. The contents of the autoclave are then reacted with a total of 1,000 g of ethylene oxide at 160° C.. The after-reaction time is 30 minutes. After cooling to 90° C., 11.1 g of a 90% lactic acid are added. OH value: 94, acid value: 0.4. |

II. Production of the Compounds

100 Parts by weight of Acronal 290 D were mixed with the quantities of polyalkylene glycols shown in the Table in a glass beaker for 30 minutes at 60° C. until the dispersion appeared homogeneous.

III. Testing of the Compounds

Test specimens were produced as follows: the modified dispersions were placed in molds and transferred to an incubator at 40° C. to form films which were then stored for 7 days in a standard conditioning atmosphere (23° C./50% air humidity) and subsequently measured.

In general, there is a dramatic increase in viscosity. However, it may also remain the same or even decrease.

Breaking elongation increases, in some cases very considerably.

TABLE 1

Composition and properties of compounds according to the invention (Examples 2, 3, 4 and 5)

| Example | Addition | % | SC | Visc. (mPas) | Elongation % | Exudation | TG | TCK |
|---------|----------|-----|-------|---------|--------|-----------|-----|---------|
| 1 | — | 0 | 51.25 | 7500 | 1598 | No | 21 | |
| 2a | PPG 600 | 2.5 | 53.70 | 15500 | 4471 | No | | >130(32) |
| 2b | " | 7.5 | 57.60 | 6000 | 3470 | No | −6 | >130(32) |
| 2c | " | 15 | 59.10 | 1700 | >12000 | No | −35 | 16(32) |
| 3a | PPG 2020 | 2.5 | 51.80 | 36000 | 4544 | No | | |
| 3b | " | 7.5 | 54.30 | 38000 | 5642 | No | −2 | >130(32) |
| 3c | " | 15 | 58.30 | 122000 | 6214 | No | −17 | 14(32) |
| 4a | A | 2.5 | 50.80 | 18500 | 4159 | No | | |
| 4b | " | 7.5 | 51.93 | 64000 | 5875 | No | −12 | |
| 4c | " | 15 | 52.50 | 1100000 | | Yes | | |
| 5a | B | 2.5 | 54.00 | 10500 | 4312 | No | | |
| 5b | " | 7.5 | 56.30 | 7400 | 6819 | No | 9 | |
| 5c | " | 15 | 56.70 | 11000 | 4983 | No | | |
| 6a | C | 2.5 | | 11000 | 4779 | | | >130 |
| 6b | " | 7.5 | | 28000 | 4274 | | | 52 |
| 6c | " | 15.0 | | 70000 | 9000 | | | 10 |
| 7a | D | 2.5 | 56.40 | 32000 | 4318 | No | | |
| 7b | " | 7.5 | 55.60 | 20000 | 6206 | No | 6 | |
| 7c | " | 15.0 | 62.20 | 32000 | 9021 | No | −7 | |

The solids concentration (SC) was determined as follows: 5 to 10 g of the sample are placed in an aluminium dish, heated for 2 hours at 120 to 130° C. and then reweighed. Viscosity (visc.) was determined as follows: Brookfield RVT (20° C.).

Breaking elongation (elongation) was determined under the following conditions: Instron 4302, Automatic Materials Testing System Series IX, sample width 5 mm, sample thickness 1 mm, sample length 15 mm, pulling rate 200 mm/minute.

The compatibility of the components (exudation) was determined as follows: the films were stored between silicone paper at 60° C. and, after 3 weeks, were evaluated for staining of the paper.

The glass transition temperature (TG) was determined as follows: DSC 910 measuring cell with DuPont 2100, Al crucible with cover, 3 l/h $N_2$, 20 K/minute.

Tackiness (TCK) was determined as follows: a steel ball (diameter 20 mm, weight 32.25 g) rolled down a ramp (height 26 mm, length 115 mm) onto a film of the composition according to the invention. The distance travelled on the polymer film was measured (in mm).

The individual results are set out in the Table and show the following

- The aliphatic plasticizers are compatible with the aromatic copolymers (no exudation).
- The glass transition temperature is greatly reduced. Values below −10° C. and even below −20° C. are obtained.
- The compositions become tacky after an addition of about 10%.

What is claimed is:

1. An adhesive, sealing and coating composition consisting essentially of: a copolymer of styrene with an alkyl acrylate, wherein the styrene copolymer comprises more than about 30% by weight styrene, the copolymer being plasticized by a plasticizing effective amount of a first plasticizer selected from the group consisting of (a) a first non-aromatic polyalkylene oxide, (b) a reaction product of one or more fatty compounds and a compound selected from the group consisting of (i) an alkylene oxide, (ii) a second non-aromatic polyalkylene oxide and (iii) mixtures thereof, and (c) mixtures thereof.

2. The composition as claimed in claim 1, wherein said composition further comprises as a second plasticizer at least one fatty compound which is not reacted with an alkylene oxide.

3. The composition as claimed in claim 1, wherein the styrene copolymer contains more than about 60% by weight of styrene.

4. The composition as claimed in claim 1, wherein said first non-aromatic polyalkylene oxide is a polymer of monomers selected from the group consisting of ethylene oxide, propylene oxide, butylene oxide and mixtures thereof.

5. The composition as claimed in claim 1, wherein said first or second non-aromatic polyalkylene oxide is a block copolymer.

6. The composition as claimed in claim 1, wherein the fatty compound of the reaction product is selected from the group consisting of fatty acids, fatty alcohols and derivatives thereof.

7. The composition as claimed in claim 1, wherein the plasticizer has a molecular weight of more than about 400.

8. The composition as claimed in claim 1, wherein plasticizer has a molecular weight of more than about 600.

9. The composition as claimed in claima 1, wherein the plasticizer has a molecular weight of more than about 1,000.

10. The composition as claimed in claim 1, wherein for every 100 parts by weight of styrene copolymer, there are about 0.5 to about 50 parts of the first plasticizer.

11. The composition as claimed in claim 1, wherein for every 100 parts by weight of styrene copolymer, there are about 2.5 to about 40 parts of the first plasticizer.

12. The composition as claimed in claim 1, wherein for every 100 parts by weight of styrene copolymer, there are about 7.5 to about 15 parts of the first plasticizer.

13. A process for producing the compound claimed in claim 1, comprising the step of adding the plasticizer to an aqueous dispersion of the styrene copolymer.

14. A process for the production of adhesives, sealing compounds and coating compounds, wherein the improvement comprises producing said adhesives, sealing compounds and coating compounds with composition claimed in claim 1.

15. The improved process of claim 14, further comprising the step of laying floor coverings with the adhesive produced by the improved process.

16. The improved process of claim 14, further comprising the step of sealing joints with the sealing compound produced by the improved process.

17. An adhesive, sealing and coating composition consisting essentially of: an aqueous dispersion of a poly(styrene-co-butyl acrylate), the poly(styrene-co-butyl acrylate) being plasticized by a plasticizing effective amount of a first plasticizer selected from the group consisting of (a) a first non-aromatic polyalkylene oxide, (b) a reaction product of one or more fatty compounds and a compound selected from the group consisting of (i) an alkylene oxide, (ii) a second non-aromatic polyalkylene oxide and (iii) mixtures thereof, and (c) mixtures thereof.

18. The composition of claim 1, wherein the first non-aromatic polyalkylene oxide is polypropylene glycol.

19. The composition as claimed in claim 1, wherein the reaction product of the first plasticizer is of a fatty compound selected from the group consisting of fatty acids, fatty alcohols and derivatives thereof and an alkylene oxide selected from the group consisting of ethylene oxide, propylene oxide, butylene oxide and mixtures thereof.

20. The composition as claimed in claim 17, wherein the reaction product of the first plasticizer is of a fatty compound selected from the group consisting of fatty acids, fatty alcohols and derivatives thereof and an alkylene oxide selected from the group consisting of ethylene oxide, propylene oxide, butylene oxide and mixtures thereof.

21. The composition as claimed in claim 17, wherein said composition further comprises as a second plasticizer at least one fatty compound which is not reacted with an alkylene oxide.

22. An adhesive, sealing and coating composition consisting essentially of (a) a copolymer of styrene with a comonomer selected from the group consisting of methacrylate, vinyl ester, maleic acid ester, ethylene, acrylamide, acrylic acid, butadiene, acrylonitrile and mixtures thereof and a plasticizing effective amount of a first plasticizer selected from the group consisting of (a) a first non-aromatic polyalkylene oxide, (b) a reaction product of one or more fatty compounds and a compound selected from the group consisting of (i) an alkylene oxide, (ii) a second non-aromatic polyalkylene oxide and (iii) mixtures thereof, and (c) mixtures thereof.

23. The composition as claimed in claim 22, wherein the reaction product of the first plasticizer is of a fatty compound selected from the group consisting of fatty acids, fatty alcohols and derivatives thereof and an alkylene oxide selected from the group consisting of ethylene oxide, propylene oxide, butylene oxide and mixtures thereof.

24. The composition as claimed in claim 22, wherein said composition further comprises as a second plasticizer at least one fatty compound which is not reacted with an alkylene oxide.

* * * * *

UNITED STATES PATENT AND TRADEMARK OFFICE
CERTIFICATE OF CORRECTION

PATENT NO. : 6,800,682 B2
DATED : October 5, 2004
INVENTOR(S) : Windhoevel et al.

It is certified that error appears in the above-identified patent and that said Letters Patent is hereby corrected as shown below:

<u>Column 10,</u>
Line 66, delete "claima" and insert -- claim --.

Signed and Sealed this

Eleventh Day of April, 2006

JON W. DUDAS
*Director of the United States Patent and Trademark Office*